United States Patent Office 2,952,595
Patented Sept. 13, 1960

2,952,595

TREATMENT WITH IONIZING RADIATION OF POLYETHYLENE CONTAINING PARTICULATE FILLER REACTED WITH VINYLTRIETHOXYSILANE

Hubert F. Jordan and Wendell V. Smith, Nutley, N.J., assignors to United States Rubber Company, New York, N.Y., a corporation of New Jersey No Drawing. Filed Mar. 14, 1957, Ser. No. 645,916

5 Claims. (Cl. 204—154)

This invention relates to a method of improving the properties of polyethylene, involving treating with ionizing radiation polyethylene containing a filler that has been treated with vinyltriethoxysilane.

Polyethylene is a known thermoplastic resin that has certain good physical properties, but it has nevertheless been desired to improve its physical properties still further. For many products it does not have enough stiffness. Incorporation of fillers increases stiffness but also imparts poor impact strength and high brittle point. Therefore, in the past commercial practice, incorporation of fillers in polyethylene has been limited to low volume loadings (e.g. 0.5 to 3%), such addition being primarily merely for purposes of pigmentation and particularly for screening out ultra violet light. Another advantage of incorporating fillers is that upon treating such mixtures with ionizing radiation, a product having good tensile strength at high temperatures is thereby obtained. Thus it is particularly desirable to obtain a filled polyethylene composition which has good impact strength and a low brittle point.

In British Patent 732,047 issued to the United Kingdom Atomic Energy Authority on June 15, 1955, it is disclosed that treatment of polyethylene with ionizing radiation decreases the solubility of the polyethylene. British Patent 742,933 issued to the United Kingdom Atomic Energy Authority on January 4, 1956, discloses that treatment of polyethylene containing carbon black with ionizing radiation produces a substance of increased mechanical strength.

We have now found, unexpectedly, that exposure of polyethylene containing certain fillers, which have been treated with vinyltriethoxysilane, to ionizing radiation produces a surprising increase in impact strength, as well as a marked lowering of the brittle point, together with other highly desirable improvements in properties. These results are particularly unexpected in view of the fact that they are not obtained when polyethylene itself is subjected to ionizing radiation.

The peculiar results obtained in the present process are obtained only with certain fillers, and only when such fillers are treated with vinyltriethoxysilane. The fillers which are operable in the invention are the mineral fillers in general, particularly the inorganic compounds of silicon, such as silica, calcium silicate and aluminum silicate, as well as the metal oxides, such as the oxides of zinc, aluminum, or titanium. For purposes of the invention such fillers may be present in amount of from about 10% to 30% of the volume of the polyethylene-filler mixture. At substantially higher volume loadings of filler the products are unsatisfactory, since they are brittle and fragile. At substantially lower volume loadings of filler the products similarly fail to display the desirable combination of properties of the product produced by the method of the invention.

It is desired to emphasize that for purposes of the invention it is essential that the filler be treated with vinyltriethoxysilane. Such treatment may be carried out before the filler is mixed with the polyethylene (in which case we usually refer to it as a "pre-treatment") or the treatment may be carried out during or subsequent to the mixing of the filler with the polyethylene (in which case we frequently refer to it as an "in situ" treatment). In any case, the filler is generally subjected to the action of the vinyltriethoxysilane at an elevated temperature of, for example, 150° to 300° F. The amount of vinyltriethoxysilane employed usually ranges from 0.5 to 15% of the weight of the filler. As little vinyltriethoxysilane as 0.5% causes an increase in the impact strength. Improvements in physical properties (particularly in impact strength and brittle point) are obtained with amounts of vinyltriethoxysilane up to about 15% of the weight of the filler.

Conveniently, the treatment with vinyltriethoxysilane is carried out in situ on regular rubber or plastics processing equipment. The selected filler and the vinyltriethoxysilane are added to the polyethylene on a rubber mill or the like, typically at a temperature of about 240° to 250° F. The desired reaction of the vinyltriethoxysilane with the filler is accomplished at the same time that the intimate mixture of the polyethylene and filler is obtained. If desired, the vinyltriethoxysilane may be reacted with the filler in a separate container (pre-treatment), and the resulting product added to the polyethylene and mixed as above. Also, if desired, in either case an additional mixing for a short period of time (e.g., 10–20 minutes) at a higher temperature (e.g. 280° F.) may be used to insure complete reaction between the filler and the vinyltriethoxysilane.

The polyethylene employed in the invention may be any conventional type of polyethylene, whether of the older so-called high pressure type having a relatively low density, or of the newer so-called low pressure type having a relatively high density. Polypropylene or similar polyolefin plastics, trans-polybutadiene, 1,2-polybutadiene, or trans-polyisoprene may be substituted for the polyethylene with similar results.

Fillers which are particularly suitable for use in the invention include the following commercially available materials (all of which are finely divided, particulate substances):

Hi Sil, a very fine particle size hydrated silica of 0.030 micron average particle size, surface area 110 sq. meters/gm., loss on ignition 10%.

Silene EF, a precipitated, hydrated calcium silicate of very fine particle size (0.030 micron average particle size, surface area 80 sq. meters/gm., loss on ignition 15%).

Celite, a diatomaceous earth which is principally a hydrated silica containing 3–10% water.

Alumina C, a hydrated aluminum oxide of small particle size (0.06 micron).

Kadox, a zinc oxide filler with a surface area of about 10 sq. meters/gm.

Suprex Clay, a kaolin clay with plate-like particles of a wide distribution of sizes averaging approximately 0.5 micron and containing 14% water of hydration.

Titanox A, a pigment grade commercial titanium dioxide.

The term "ionizing radiation" is used herein in its conventional sense as referring to radiation which, when absorbed by matter, produces ionization. Usage of this term as applying to high energy radiation is illustrated by the British Patents 732,047 and 742,933 referred to above, as well as Glasstone "Principles of Nuclear Reactor Engineering" (Van Nostrand, 1955, pages 64–66); Charlesby, Nature, 171, 167; Lawton et al., Nature, 172, 76; Charlesby, Proc. Ray. Soc. of London, 215, 187; Charlesby, Nucleonics, June 1954, 18; Collinson et al., "The Radiation Chemistry of Organic Substances,"

Chemical Reviews, 56, 474, June 1956; Burton, "An Introduction to Radiation Chemistry," J. Chem. Educ., 28, 404 (1951); Dainton, "Chemical Reactions Induced by Ionizing Radiations," Annual Reports of the Progress of Chemistry, 45, 5 (1948) (The Chemical Society of London). Examples of ionizing radiation that may be employed in the method of this invention include X-rays, gamma-rays, beta-rays, high speed electrons, high speed charged particles (protons, alpha particles, etc.) and high speed neutrons. All of the foregoing are samples of high energy radiation, i.e., radiation the energy level of which is in excess of about 8 electron volts. Of these, X-rays, gamma-rays, and high speed electrons (accelerated, e.g., through 200,000 volts or more) are particularly suitable. The dosage of the radiation is not critical, and it has been found that even relatively small quantities of energy absorbed by the material, for example, about 3 watt hours per pound of material, are sufficient to produce noticeable improvement. On the other hand, indefinitely greater dosages (e.g., 100 watt hours or even more per pound) may be used without harmful effect, and, as far as the present inventor is aware, there is no particular upper limit to the useful dosage of ionizing radiation. Although in most cases it is preferred to subject the material to a dosage such that at least 5 or more watt hours, and more preferably about 10 to 40 watt hours per pound are absorbed, it will usually be found that there is no proportionate added advantage in exceeding a dosage of about 50 watt hours per pound of material.

By the method of the invention, the properties of the polyethylene, containing a filler of the class defined treated with vinyltriethoxysilane, are consistently and considerably improved in a most surprising fashion. At present, it is not understood why irradiation of the composition containing the vinyltriethoxysilane treated filler should be so effective. As will be shown in the working examples below, the vinyltriethoxysilane treated fillers in combination with ionizing radiation treatment results in polyethylene products having improved room temperature tensile strength, lower torsional hysteresis at elevated temperatures, much improved notched impact strength (at room temperature and at 32° F.), and improved brittle point.

The foregoing improvements are surprising in that the treatment with vinyltriethoxysilane greatly enhances the beneficial effect which radiation treatment has on the filled polyethylene. Other similar silane chemicals show only slight enhancements of the effects of radiation and none has been found comparable to vinyltriethoxysilane in either the magnitude of the improvement or the consistency with which improvement is obtained. Other silane chemicals which have shown slight improvements are:

Allyltriethoxysilane;
The reaction product of vinyltrichlorosilane with diethylene glycol;
The reaction product of cyclohexenyltrichlorosilane with diethylene glycol; and
The reaction product of cyclohexenyltrichlorosilane with ethylene oxide.

As a practical matter, the results obtained with the foregoing silane chemicals do not compare too favorably with the consistent marked improvement obtained when vinyltriethoxysilane treated fillers are used in accordance with the invention.

The following examples, in which all parts are expressed by weight, will serve to illustrate the practice of the invention in more detail.

*Example I*

This example illustrates the effectiveness of the vinyltriethoxysilane as treating material according to this invention. 100 parts of polyethylene (a commercial product designated as DE 3422) was mixed on a rubber mill at 240°–250° F. with 54 parts of Hi Sil and 2 parts of vinyltriethoxysilane. After mixing was completed, the temperature of the mill was increased to 280° F. and mixing was continued for 10 minutes. Test pieces (6½" x 6½" x 0.1") were prepared by molding in a press. The pieces so prepared were subjected to ionizing radiation by passing them through the electron beam produced by a 2 million volt Van de Graaff electron accelerator. After irradiation, the pieces were tested by methods standard to the rubber and plastic industry, with the results listed below.

For comparative purposes, in one piece no treating material was used (I–A below), and in another piece, #8 oil (a commercially available grade of hydrocarbon oil) was introduced as an example of an inert oil (I–B below).

It will be noted that the sample that includes the vinyltriethoxysilane of this invention (I–C) possesses improved physical properties over both the blank (I–A) and the inert oil (I–B), particularly in respect to impact strength and lowered brittle point. Torsional hysteresis is also lowered. Tensile strength after irradiation is also improved as compared to the control samples.

|  | I–A | I–B | I–C |
|---|---|---|---|
| Polyethylene | 100 | 100 | 100 |
| Hi Sil | 54 | 54 | 54 |
| #8 oil |  | 2 |  |
| Vinyltriethoxysilane |  |  | 2 |
| Room temperature tensile, lbs./in.$^2$ (Scott) | | | |
| Treatment with ionizing radiation: | | | |
| 0 watt hrs./lb | 2,160 | 1,940 | 2,100 |
| 20 watt hrs./lb | 2,320 | 2,000 | 2,680 |
| 40 watt hrs./lb | 2,420 | 1,960 | 2,830 |
| 260° F. tensile, lbs./in.$^2$ (Scott) | | | |
| 0 watt hrs./lb | 310 | 74 | 140 |
| 20 watt hrs./lb | 654 | 278 | 642 |
| 40 watt hrs./lb | 645 | 383 | 752 |
| 280° F. torsional hysteresis | | | |
| 0 watt hrs./lb | (1) | (1) | (1) |
| 20 watt hrs./lb | .284 | .405 | .228 |
| 40 watt hrs./lb | .245 | .300 | .140 |
| Room temp. notched Izod impact strength | | | |
| 0 watt hrs./lb | 0.6 | 0.5 | 0.8 |
| 20 watt hrs./lb | 2.3 | 0.6 | 5.8 |
| 40 watt hrs./lb | 2.8 | 1.0 | 6.6 |
| 32° F. notched Izod impact strength | | | |
| 0 watt hrs./lb | 0.5 | 0.4 | 0.5 |
| 20 watt hrs./lb | 1.0 | 0.5 | 4.1 |
| 40 watt hrs./lb | 1.2 | 0.6 | 5.4 |
| Bell brittle point ° C. | | | |
| 0 watt hrs./lb | 2 R.T. | R.T. | R.T. |
| 20 watt hrs./lb | R.T. | R.T. | −4 |
| 40 watt hrs./lb | 21 | R.T. | −4 |

1 Could not be run.
2 R.T.=room temperature.

In a similar fashion other materials may be substituted in place of the Hi Sil, also with resulting improvements in physical properties. Other fillers which may be used include Kadox 105, Titanox 108, Suprex Clay 72, Aluminum C–67, Celite 60, and Silene EF–58.

Example II

This example is illustrative of the improvements which may be obtained through the use of varying amounts of the vinyltriethoxysilane of this invention.

100 parts of polyethylene, 27 parts of Hi Sil, and varying amounts as below of vinyltriethoxysilane were mixed and prepared for testing as in Example I. One example (II-A below) contained no vinyltriethoxysilane and is included for comparative purposes.

Examination of the results of the tests as given below will show that addition of small portions of the vinyltriethoxysilane of this invention will give improvements in the impact strength and brittle point of the material, while larger amounts will lead to improved tensile strength. The treating material of this invention is therefore effective over a wide range of addition.

|  | II-A | II-B | II-C | II-D | II-E |
|---|---|---|---|---|---|
| Polyethylene (parts) | 100 | 100 | 100 | 100 | 100 |
| Hi Sil (parts) | 27 | 27 | 27 | 27 | 27 |
| Vinyltriethoxysilane (parts) | -------- | 0.5 | 1 | 2 | 4 |
| Room temp. tensile (Scott) lbs./in.$^2$ | | | | | |
| Treatment with ionizing radiation: | | | | | |
| 0 watt hrs./lb | 1,970 | 1,890 | 1,940 | 1,900 | 1,880 |
| 20 watt hrs./lb | 2,040 | 2,090 | 2,160 | 2,100 | 2,150 |
| 40 watt hrs./lb | 2,160 | 2,170 | 2,100 | 2,270 | 2,220 |
| 260° F. tensile (Scott) lbs./in.$^2$ | | | | | |
| 0 watt hrs./lb | 39 | 0 | 22 | 5 | 11 |
| 20 watt hrs./lb | 292 | 307 | 214 | 260 | 275 |
| 40 watt hrs./lb | 230 | 383 | 361 | 397 | 413 |
| Room temp. notched Izod impact strength | | | | | |
| 0 watt hrs./lb | 1.1 | 2.8 | 1.0 | 0.9 | 1.1 |
| 20 watt hrs./lb | 2.5 | 5.4 | 5.3 | 5.7 | [1] 7.5 |
| 40 watt hrs./lb | 3.7 | [1] 8.2 | [1] 6.7 | [1] 6.9 | [1] 8.5 |
| 32° F. notched Izod impact strength | | | | | |
| 0 watt hrs./lb | 0.8 | 1.2 | 0.6 | 0.7 | 0.7 |
| 20 watt hrs./lb | 1.2 | 2.6 | 2.9 | 3.3 | 5.8 |
| 40 watt hrs./lb | 1.8 | 5.1 | 4.4 | 5.2 | [1] 8.2 |
| Bell brittle point, ° C. | | | | | |
| 0 watt hrs./lb | 25 | 25 | 25 | 25 | 25 |
| 20 watt hrs./lb | 13 | −10 | −15 | −10 | −27 |
| 40 watt hrs./lb | 7 | −17 | −16 | −16 | −32 |

[1] Incomplete breaks obtained in test.

Similar improvements are obtained with varied amounts of Hi Sil.

It will be apparent from the foregoing that remarkable improvements are made possible by the invention, and the treated polyethylene composition is rendered more useful for making all sorts of articles, such as molded containers, that are more resistant to impact and less liable to breakage at low temperatures. The products of the invention are also unusually useful at elevated temperatures, because they retain a much greater proportion of the original strength when heated to high temperatures.

It is desired to emphasize that such new results of the present radiation treatment are particularly unexpected in view of the fact that treatment of these same fillers with vinyltriethoxysilane does not improve the polyethylene compositions, in the absence of the radiation step, as is amply demonstrated by the data in the foregoing examples.

Having thus described our invention, what we claim and desire to protect by Letters Patent is:

1. A method comprising subjecting to high energy ionizing radiation a composition comprising polyethylene and from 10% to 30% by volume of a finely divided filler, the said percentages being based on the combined volume of polyethylene and filler, and the said filler comprising a reaction product of a substance selected from the group consisting of silica, calcium silicate, aluminum silicate, zinc oxide, aluminum oxide and titanium dioxide, with from 0.5% to 15%, by weight of such substance, of vinyltriethoxysilane, the dosage of said ionizing radiation being at least 3 watt hours per pound of said composition, whereby the physical properties of the said composition are substantially enhanced.

2. A method comprising treating a finely divided mineral filler selected from the group consisting of silica, calcium silicate, aluminum silicate, zinc oxide, aluminum oxide and titanium dioxide with from 0.5% to 15%, by weight of such filler, of vinyltriethoxysilane at a temperature of from 150° to 300° F., mixing 10% to 30% by volume of such treated filler with polyethylene, the said volume percentages being based on the combined volume of polyethylene and filler, and subsequently exposing the mixture to high energy ionizing radiation, the dosage of said ionizing radiation being at least 3 watt hours per pound of said mixture, whereby the impact strength is improved, the brittle point is lowered, and torsional hysteresis is improved.

3. A method comprising mixing polyethylene with from 10% to 30% by volume of a finely divided filler, the said percentages being based on the combined volume of polyethylene and filler, the said filler being selected from the group consisting of metal oxides, metal silicates, and silica, and with from 0.5% to 15%, based on the weight of such filler, of vinyltriethoxysilane at a temperature of 240 to 280° F., and subsequently subjecting the resulting mixture high energy to ionizing radiation, the dosage of said ionizing radiation being at least 3 watt hours per pound of said mixture, whereby the properties of the mixture are improved.

4. The product of the method of claim 1, characterized by improved impact strength and lower brittle point in comparison to the same composition not treated by said ionizing radiation.

5. A method as in claim 1, in which the filler is hydrated silica.

References Cited in the file of this patent

UNITED STATES PATENTS 2,688,007    Steinman  _____ Aug. 31, 1954

FOREIGN PATENTS 665,262    Great Britain  _____ Jan. 23, 1952

OTHER REFERENCES

"Chem. and Eng. News," vol. 33, pp. 5091, 5092, Nov. 21, 1955.